July 14, 1925. 1,545,744

F. M. DAVIS

MILLING MACHINE

Filed Dec. 31, 1920 4 Sheets-Sheet 1

WITNESSES
H. D. Chase
C. L. Naal

INVENTOR
Frank M. Davis
By R. S. Caldwell
ATTORNEY

July 14, 1925. 1,545,744
F. M. DAVIS
MILLING MACHINE
Filed Dec. 31, 1920   4 Sheets-Sheet 3

WITNESSES
H. D. Chase
C. L. Naal

INVENTOR
Frank M. Davis
By R. S. Caldwell
ATTORNEY

July 14, 1925.

F. M. DAVIS

MILLING MACHINE

Filed Dec. 31, 1920

1,545,744

4 Sheets-Sheet 4

WITNESSES

M. E. Downey

INVENTOR
Frank M. Davis
By R. S. Caldwell
ATTORNEY

Patented July 14, 1925.

1,545,744

UNITED STATES PATENT OFFICE.

FRANK M. DAVIS, OF MILWAUKEE, WISCONSIN.

MILLING MACHINE.

Application filed December 31, 1920. Serial No. 434,306.

*To all whom it may concern:*

Be it known that I, FRANK M. DAVIS, a citizen of the United States, and resident of Milwaukee, in the county of Milwaukee and State of Wisconsin, have invented new and useful Improvements in Milling Machines, of which the following is a description, reference being had to the accompanying drawings, which are a part of this specification.

The invention relates to milling machines and more particularly to those of the continuous milling type.

It is common practice in milling machines to provide gibs or other connections between the work mandrel and the milling spindles. This practice is objectionable, particularly on machines turning out large quantities of work, because it produces chattering of the spindles, resulting in uneven and inexact cutting. It is the prime purpose of this invention to overcome these difficulties by so mounting and arranging the work mandrel and the spindles for the milling cutters upon a common housing that there will be no adjustment and consequently no yielding between the centers of the mandrel and spindles.

A further object of the invention is to provide a milling machine in which the work is carried upon a rotatable carrier between roughing and finishing cutters adjacent each end of the work, one set of cutters and the carriers being adjustable to accommodate work of different lengths.

The invention further consists in the several features hereinafter set forth and more particularly defined by claims at the conclusion hereof.

Figure 1:
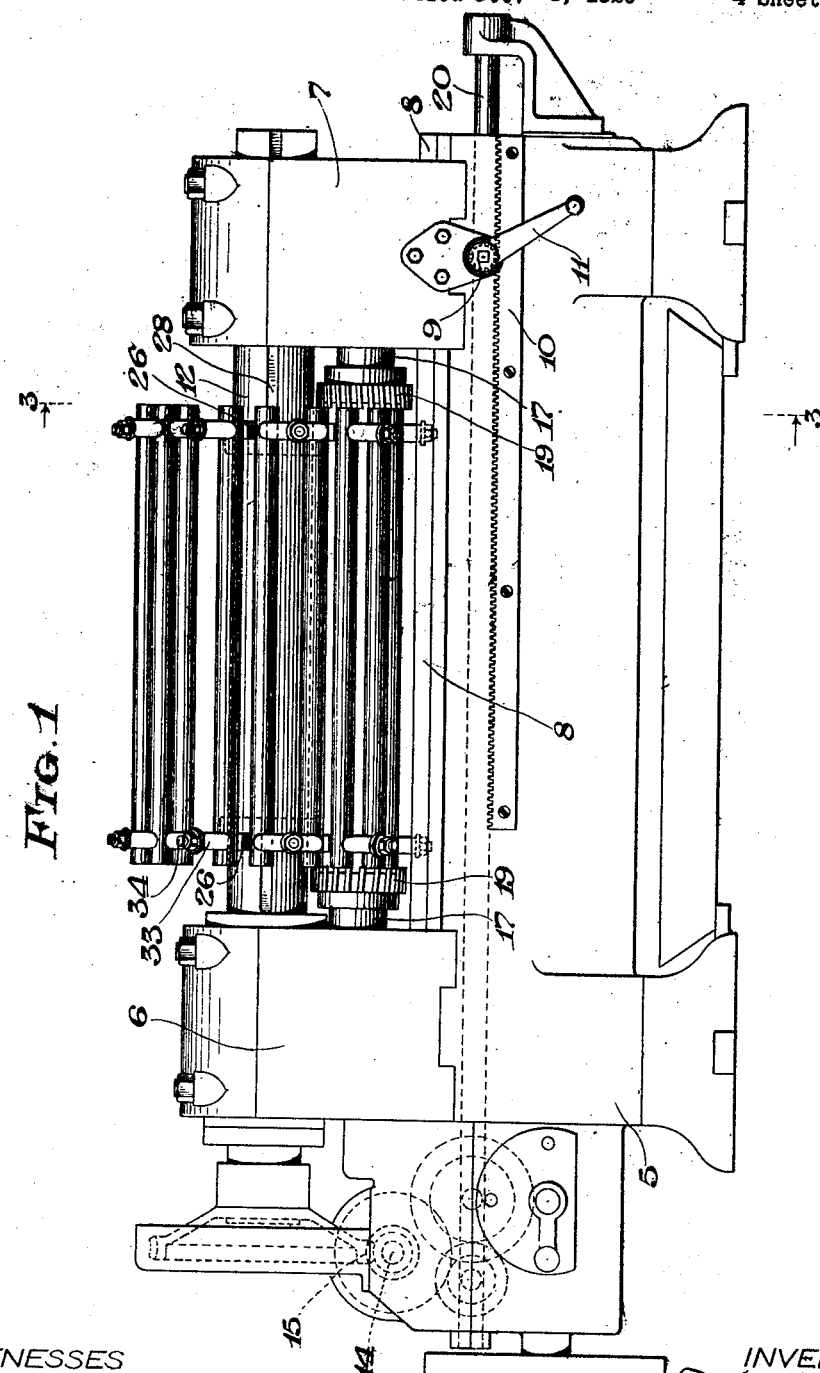
Figure 2:
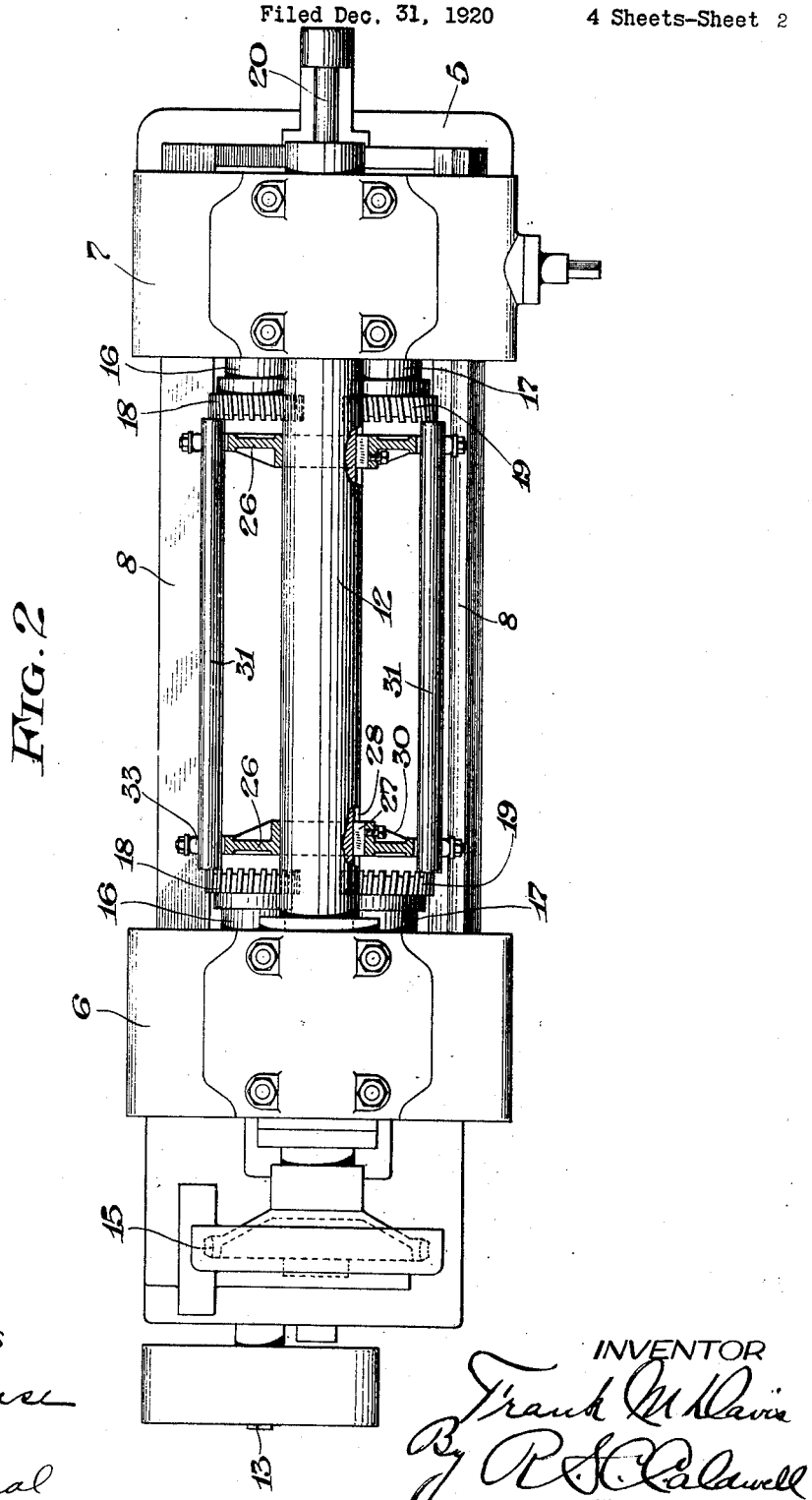
Figure 3:
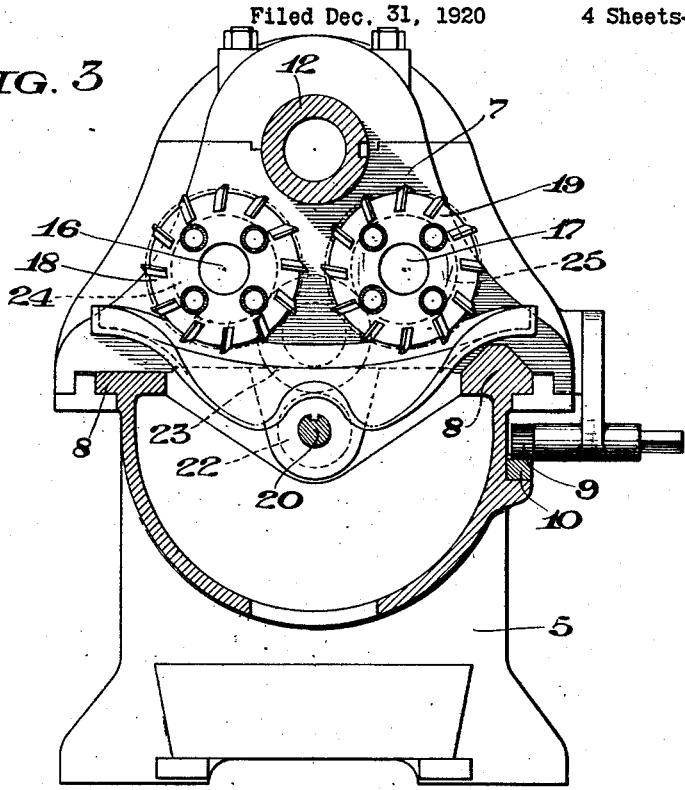
Figure 4:
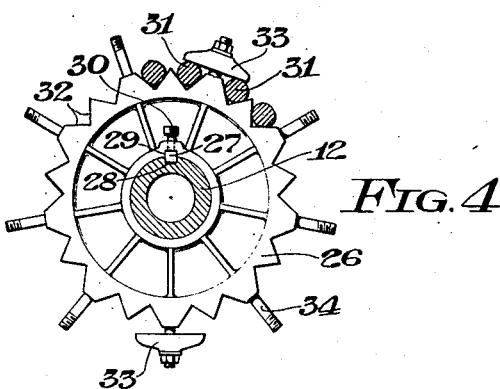
Figure 5:
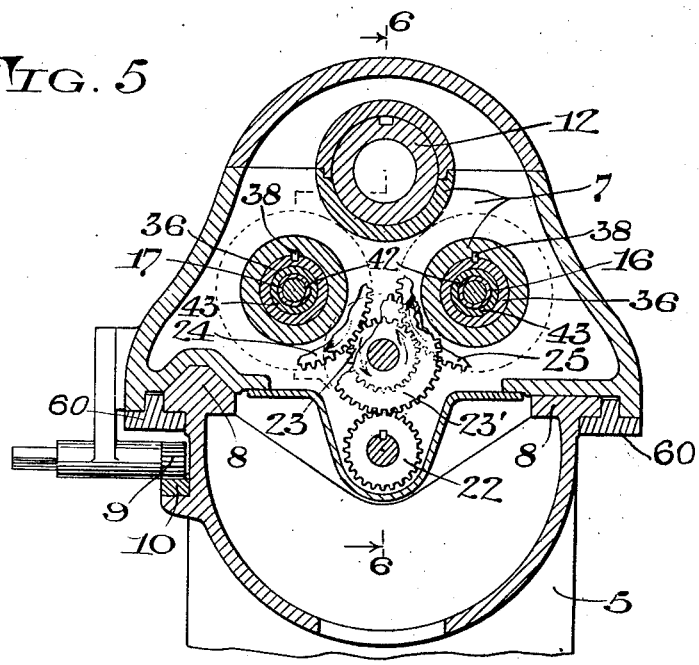
Figure 6:
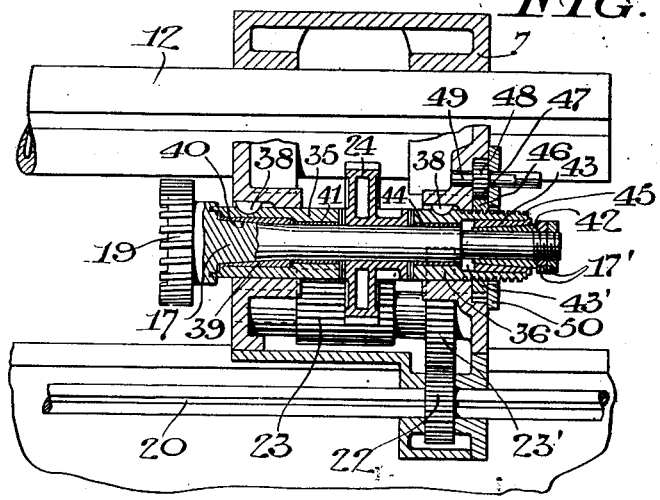

In the drawings: Fig. 1 is an elevation view of a milling machine embodying the invention; Fig. 2 is a plan view thereof; Fig. 3 is a section taken on the line 3—3 of Fig. 1; Fig. 4 is a detail view of the carrier; Fig. 5 is a vertical sectional view through one of the housings; Fig. 6 is a detail sectional view taken on the line 6—6 of Fig. 5.

In the drawings the numeral 5 designates the base or frame of the machine upon which are mounted the housings 6 and 7. The housing 6 is rigidly secured to the frame at one end while the housing 7 is similarly secured but is mounted upon ways 8 so that it may be adjustable longitudinally of the frame by any suitable means, such as a gear 9 mounted on said housing and engaging a rack 10, said gear being operated by a handle 11. When the housing 7 is properly adjusted it may be rigidly clamped to the base or frame by the usual clamping members 60.

Each housing forms a bearing for the work mandrel 12 which is driven from a power shaft 13 through a suitable gearing connection therewith including a worm 14 and a worm wheel 15.

Each housing also carries longitudinally adjustable spindles 16 and 17 for a roughing milling cutter 18 and a finishing milling cutter 19, respectively. These spindles have their bearings in the housing and their centers are fixed with respect to the center of the work mandrel so that there is no chance for displacement, no gibs or adjustable connections being used to vary or cause a varying of the position of the centers of these spindles with respect to that of the mandrel. This prevents any lateral movement of the axes of the cutters with respect to the work mandrel and assures rapid and accurate cutting at all times.

A splined cutter drive shaft 20 is journalled in the frame 5 and driven by the shaft 13 through suitable gearing. A pair of gears 22 are mounted on this shaft, one being carried by each housing, that in the housing 7 being mounted to slide on said shaft when said housing is moved along the ways 8. The shaft 20 is splined so that the gear 22 which is slidably keyed thereto may move longitudinally thereof while rotating therewith. In each instance the gear 22 meshes with a gear 23' on a shaft carrying a gear 23 which meshes with gears 24 and 25 on the spindles 16 and 17, respectively, said gears being mounted in each housing.

Figs. 5 and 6 show more in detail the provision for adjusting the cutters and the mounting of the cutters and the work mandrel. Only one of the housings and one of the cutters, such as the cutter 19, has been shown but the other housing and the cutter 18 and its mounting are identical with the construction to be described. The spindle 17 for the finishing milling cutter is journalled in alined sleeve bearings 35 and 36, each of which has a close fit in the housing, here shown as the movable housing 7, so there is no chance for play between the sleeves and the housing, and each of these sleeves is keyed to the housing by keys 38 so that they may be moved longitudinally and thereby move the spindle 17 longitudinally with respect to the housing. The gear 24 mounted on the spindle 17 to drive it also moves with it, and the gear 23 is made long enough to remain in mesh with said gear 24 in any position of adjustment of said spindle. In a similar manner the gear 25 is connected to the spindle 16 and meshes with the gear 23. A bearing bushing 39 in the sleeve 35 has a tapered bore fitting the tapered portion 40 of each spindle, and a bearing bushing 41 is also mounted in said sleeve 35. A tapered sleeve 42 is mounted at the outer end of each spindle and is journalled in a tapered bearing bushing 43 secured in a bore 43' in the outer end of the sleeve 36, and a bearing bushing 44 is also mounted in the sleeve 36. Adjusting nuts 17' on the threaded outer end of the spindle are employed to draw up the tapered bushings above described so that there will be no end play of the spindle in its journals in said sleeves. The sleeve 36 for each spindle has a screw thread 45 formed thereon and a nut 46 engages this threaded portion of said sleeve and has a gear face 47 which meshes with a gear 48 mounted on a shaft 49 adapted to be turned by a hand-crank. The gear-nut 46 is mounted in the housing and held against endwise movement by a cover plate 50. With this construction the turning of the shaft 49 will, through the gearing connection above described, turn the nut 46, which by reason of its threaded engagement with the sleeve 36 will cause a longitudinal movement of said sleeve together with the spindle, the sleeve 35 and the gear 24. It will be further noted that the mandrel 12 is journalled directly in the housing and that a solid bridge section of the housing extends from the mandrel to the spindle adjusting sleeves and that the sleeves and bearings for the spindle together with such solid section interpose an unyielding section of metal between the mandrel and spindles to maintain the centers of the spindles fixed with relation to the center of the work mandrel.

Carrier plates 26 are adjustably secured to the work mandrel 12 to turn therewith. In each instance this connection includes a key 27 mounted in a keyway 28 in the mandrel 12 and in a keyway 29 in the plate and held in position by means of a set screw 30. The work may be secured to the plates 26 in various ways, which will depend upon the shape of the work being operated upon. In the case of round bars 31 or cam shafts, a suitable clamping means, such as shown in Fig. 4, may be employed, in which the work fits into seats 32 in the plates 26 and is held therein by clamping plates 33 mounted upon bolts 34, one plate taking care of two bars.

In operation, the rotation of the work mandrel is continuous. The work upon the carrier is fed into the path of the revolving milling cutters at each end of the machine and is cut off to exact length and the ends finished off. The rotation of the work mandrel is at such a speed that the operator is kept busy in removing the finished work from the carrier and clamping new work in place thereon. The change of work is made while the machine is in operation. By means of arrangement of parts above described, the machine is kept constantly at work and will take care of as much work as can be fed to it. The mounting of the cutters and mandrel in the manner above described always insures a proper operation of the machine, which is essential because of possible wastage of large quantities of material in a relatively short time if the cutters chatter or vibrate.

I desire it to be understood that this invention is not to be limited to any specific form or arrangement of parts except as such limitations are specified in the claims.

What I claim as my invention is:

1. In a milling machine, the combination of a frame, a housing mounted thereon, a rotating work mandrel journalled in said housing, a rotating spindle journalled in said housing, the housing having an integral bridge section between the mandrel and spindle whereby the spindle's center is fixed with relation to the center of said work mandrel, and a milling cutter on said spindle operable upon the work carried by said mandrel.

2. In a milling machine, the combination of a housing, a rotating work mandrel journalled in said housing, a rotating cutter spindle journalled in said housing without gibs or other yielding connection, the housing being of integral section between the mandrel and spindle whereby the spindle's center is fixed with relation to the center of said work mandrel, and a milling cutter on said spindle operable upon the work carried by said mandrel.

3. In a continuous milling machine, the combination of a frame and spaced housings mounted thereon, a positively driven work mandrel journalled in said housings, a rotating cutter spindle journalled in each of said housings with its center fixed with relation to the center of the work mandrel, and milling cutters on said spindles operable on the work carried by the mandrel between said housings.

4. In a milling machine, the combination of a frame and spaced housings mounted thereon, a work mandrel journalled in said housings, one of said housings being movable upon the frame to vary the distance between the housings, a rotating cutter spindle journalled in each housing with its center fixed with relation to the center of said mandrel drel, work-holding means mounted on and adjustable lengthwise of said mandrel, and milling cutters on said spindles operable on the work carried by the mandrel between said housings.

5. In a milling machine, the combination of a frame and spaced housings mounted thereon, a work mandrel journalled in said housings, one of said housings being movable upon the frame to vary the distance between the housings, a rotating cutter spindle journalled in each housing with its center fixed with relation to the center of the mandrel, work-holding means mounted on and adjustable lengthwise of said mandrel including plates having adjustable keyed connections with said mandrel, milling cutters on said spindles operable on the work carried by the mandrel between said housings, a splined cutter drive shaft, and a gearing connection between said shaft and each of said spindles.

6. The combination of a pair of spaced housings, one of said housings being adjustable toward and away from the other, a work mandrel journalled in said housings, a rotatable tool spindle carried in each housing, work-holding means mounted on and adjustable lengthwise of said mandrel, and tools on said spindles operable upon the work carried by the mandrel between the housings.

7. The combination of a pair of spaced housings, one of said housings being adjustable toward and away from the other, a work mandrel journalled in said housings, a rotatable tool spindle carried in each housing, work-holding means mounted on and adjustable lengthwise of said mandrel, tools on said spindles operable on the work carried by the mandrel between the housings, a splined drive shaft, and a driving connection between said shaft and each of said spindles.

8. The combination of a pair of spaced housings, one of said housings being adjustable toward and away from the other, a work mandrel journalled in said housings, a rotatable tool spindle carried in each housing, work-holding means mounted on and adjustable lengthwise of said mandrel including plates having adjustable keyed connections with said mandrel, and tools on said spindles operable upon the work carried by the mandrel between the housings.

9. The combination of a pair of spaced housings, one of said housings being adjustable toward and away from the other, a work mandrel journalled in said housings, a rotatable tool spindle carried in each housing, work-holding means mounted on and adjustable lengthwise of said mandrel including plates having adjustable keyed connections with said mandrel, tools on said spindles operable on the work carried by the mandrel between the housings, a splined drive shaft, and a gearing connection between said shaft and each of said spindles.

10. A drum type milling machine comprising a base, upright side housings supported on the base in rigid relative relation, a rotary work drum interposed between and journaled in bearings carried by said side housings, and cutter spindles the supporting bearings of which are built into said side housings, said spindles being adapted for carrying cutters for surfacing the work on the drum.

11. A drum type milling machine comprising a base, spaced hollow column side housings rigid thereon, a rotary work-carrying drum interposed between and supported by said housings, and cutter spindles built into the side housings between the front and back walls thereof and adapted for carrying cutters between the housings.

12. A drum type milling machine comprising a base, upright side housings thereon, a rotary work-carrying drum having trunnion ends journaled in said housings, removable bearing caps permitting removal of the drum from the housings, and cutter spindles carried by the housings and adapted to be equipped with cutters for surfacing the work-pieces as they are moved between the cutters by the drum.

13. A drum type milling machine comprising a base, spaced upright side housings thereon, a rotary work-carrying drum interposed between said side housings and having trunnion ends journaled thereon, cutter spindles on the side housings for milling the interposed work, and means permitting the work drum to be removed as an entirety without dismantling the side housings.

14. A drum type milling machine comprising a base, upright side housings rigid thereon, a rotary work-carrying drum interposed between and journaled at its ends on said side housings, and cutter spindles located on each side housing and journaled in bearings supported directly by interiorly disposed walls of the side housing.

15. A drum type milling machine comprising housings in rigid spaced relation, a rotary work-carrying drum interposed between and supported at its ends on said housings, and cutter spindles on said housings adapted for carrying cutters for surfacing the work, said drum and spindles being journaled in bearings directly supported by interiorly disposed walls of said housings.

16. A drum type milling machine of the character described comprising spaced upright side housings, a rotary work-carrying drum mounted between and upon said side housings, and surface milling cutter spindles the supporting bearings of which are built into the side housings, 17. A drum type milling machine comprising a base, upright side housings thereon, a rotary work-carrying drum, cutter spindles for each side housing, a spindle-driving shaft for the spindles of each side housing, and bearings for said drum, cutter spindles and spindle-driving shafts, each side housing being shaped interiorly to provide support for said bearings.

18. A drum type milling machine comprising a base, upright side housings thereon, a rotary work-carrying drum, cutter spindles, said drum and spindles being arranged in co-operative relation so that work-pieces on the drum will be carried by rotation thereof between the cutter spindles so as to be milled thereby, and the side housings being shaped interiorly to provide support for the drum and cutter spindles in said relation.

19. A drum type milling machine comprising a base, spaced upright side housings rigid thereon, a rotary work-carrying drum interposed between and supported by said side housings, a plurality of cutter spindles located upon one of said side housings and supported in bearings part of which are built into and rigid with relation to said side housings, a gear on each cutter spindle, and a spindle-driving shaft having gears meshing with the spindle gears.

20. A drum type milling machine comprising a base, spaced upright side housings rigid thereon, a rotary work-carrying drum interposed between and supported by said side housings, a plurality of cutter spindles journaled in bearings built into the side housings, a gear on each spindle, a gear-equipped shaft for each side housing for driving the spindle gears thereof, and a drive shaft connected at its opposite ends to said shafts.

In testimony whereof, I affix my signature.

FRANK M. DAVIS.